US009887643B2

(12) United States Patent
Izadian (10) Patent No.: US 9,887,643 B2
(45) Date of Patent: Feb. 6, 2018

(54) BIDIRECTIONAL ELECTRICAL SIGNAL CONVERTER

(71) Applicant: Indiana University Research and Technology Corporation, Indianapolis, IN (US)

(72) Inventor: Afshin Izadian, Indianapolis, IN (US)

(73) Assignee: Indiana University Research and Technology Corporation, Indianapolis, IN (US)

( * ) Notice: Subject to any disclaimer, the term of this patent is extended or adjusted under 35 U.S.C. 154(b) by 0 days.

(21) Appl. No.: 15/023,228

(22) PCT Filed: Sep. 19, 2014

(86) PCT No.: PCT/US2014/056430
§ 371 (c)(1),
(2) Date: Mar. 18, 2016

(87) PCT Pub. No.: WO2015/042332
PCT Pub. Date: Mar. 26, 2015

(65) Prior Publication Data
US 2016/0233790 A1 Aug. 11, 2016

Related U.S. Application Data

(60) Provisional application No. 61/880,649, filed on Sep. 20, 2013.

(51) Int. Cl.
*G05F 1/00* (2006.01)
*H02M 1/00* (2006.01)
(Continued)

(52) U.S. Cl.
CPC ............... *H02M 7/797* (2013.01); *H02J 3/28* (2013.01); *H02J 7/022* (2013.01);
(Continued)

(58) Field of Classification Search
CPC ....... G05F 1/565; H02M 3/156; H02M 3/157; H02M 3/158
(Continued)

(56) References Cited

U.S. PATENT DOCUMENTS 4,396,818 A * 8/1983 Kominami ............. H05B 6/062
219/625
6,069,804 A * 5/2000 Ingman ................. H02J 7/0068
363/124

(Continued)

FOREIGN PATENT DOCUMENTS

JP 2001037226 A 2/2001
JP 2012239292 A 12/2012
(Continued)

OTHER PUBLICATIONS

International Search Report and Written Opinion issued by the ISA/US, Commission for Patents, dated Dec. 30, 2014 for related Application No. PCT/US2014/056430; 14 pages.
(Continued)

*Primary Examiner* — Gary Nash
(74) *Attorney, Agent, or Firm* — Faegre Baker Daniels LLP (57) ABSTRACT

A bidirectional AC-to-DC and DC-to-AC circuit includes a first inductor-capacitor (LC) circuit connected to an AC power source, a transistor synchronized with the AC power source signal, a second LC circuit electrically connected to the synchronized transistor and the first inductor-capacitor circuit, a high-frequency switching transistor electrically connected to the second inductor-capacitor circuit and a direct current (DC) load, and a controller connected to the high-frequency switching transistor. The controller identifies an error between a measured DC output signal and a predetermined DC output signal that is applied to the DC load, and adjusts a duty cycle of a pulse width modulation
(Continued)

(PWM) switching signal for the high-frequency transistor to reduce the identified error.

19 Claims, 6 Drawing Sheets

(51) Int. Cl.
*H02M 7/757* (2006.01)
*H02M 7/797* (2006.01)
*H02J 3/28* (2006.01)
*H02J 7/02* (2016.01)
*H02M 7/219* (2006.01)
*H02M 7/48* (2007.01)

(52) U.S. Cl.
CPC ............... *H02M 2007/2195* (2013.01); *H02M 2007/4815* (2013.01); *Y02B 70/1408* (2013.01); *Y02B 70/1441* (2013.01)

(58) Field of Classification Search
USPC ....... 323/241, 272, 246, 274–276, 279, 280, 323/283–285, 288; 363/20–21.02, 363/21.04–21.06, 21.1, 21.11, 363/21.12–21.14, 21.18, 78, 79
See application file for complete search history.

(56) References Cited

U.S. PATENT DOCUMENTS

| | | | | |
|---|---|---|---|---|
| 6,653,824 | B1* | 11/2003 | Whitlock | G05F 1/40 323/344 |
| 6,842,353 | B2 | 1/2005 | Yamada et al. | |
| 7,551,462 | B2 | 6/2009 | Uruno et al. | |
| 7,791,909 | B2 | 9/2010 | Koo et al. | |
| 8,242,758 | B2 | 8/2012 | Choi et al. | |
| 2004/0027111 | A1* | 2/2004 | Lee | G01J 5/24 323/288 |
| 2004/0037100 | A1* | 2/2004 | Orr | H02M 3/33576 363/131 |
| 2004/0227496 | A1 | 11/2004 | Hosotani et al. | |
| 2007/0171680 | A1* | 7/2007 | Perreault | H02M 1/34 363/16 |
| 2008/0258687 | A1* | 10/2008 | So | H02J 7/0052 320/145 |
| 2010/0244802 | A1 | 9/2010 | Alexander | |
| 2011/0205762 | A1* | 8/2011 | Pan | H02M 7/4807 363/21.04 |
| 2011/0234187 | A1* | 9/2011 | Brown | H02M 3/1588 323/282 |
| 2012/0104859 | A1 | 5/2012 | Nii et al. | |
| 2012/0176090 | A1 | 7/2012 | Andrea et al. | |
| 2012/0257429 | A1 | 10/2012 | Dong et al. | |
| 2013/0147280 | A1 | 6/2013 | Oettinger | |

FOREIGN PATENT DOCUMENTS

| | | |
|---|---|---|
| KR | 20040083186 A | 10/2004 |
| WO | WO 0221672 A1 | 3/2002 |

OTHER PUBLICATIONS

Singh et al., A Review of Single-Phase Improved Power Quality AC-DC Converters, IEEE Transactions on Industrial Electronics, vol. 50, No. 5, Oct. 2003 (retrieved Nov. 18, 2014), Retrieved from Internet; <URL: http://www.eprint.iitd.ac.in/bitstream/2074/2025/1/singhrev2003.pdf>, pp. 962-981; 20 pages.

Ashari et al., A Single Phase Parallely Connected Uninterruptible Power Supply/Demand Side Management System, IEEE Transactions on Energy Conversion, vol. 15, No. 1, Mar. 2000 (retrieved Nov. 21, 2014), Retrieved from Internet: http://personal.its.ac.id/files/pub/3520-Ashari-EC00.pdf, pp. 97-102; 6 pages.

Bojrup et al., A Dual Purpose Battery Charger for Electric Vehicles, University paper (online) Lund Institute of Technology, 2014 (retrieved Nov. 21, 2014), Retrieved from Internet <URL: https://web.archive.org/web/20040205061012/http:www.iea.lth.se/-ielper/charger/PESC98-paper.pdf>, pp. 1-6.

International Search Report and Written Opinion issued by the Korean Intellectual Property Office, dated Nov. 12, 2014, for International Application No. PCT/US2014/047574; 8 pages.

* cited by examiner

BIDIRECTIONAL ELECTRICAL SIGNAL CONVERTER

CLAIM OF PRIORITY

This application is a national phase of International Application No. PCT/US2014/056430, titled "Bidirectional Electrical Signal Converter," filed on Sep. 19, 2014, which claims priority to U.S. Provisional Application No. 61/880,649, which is entitled "Bidirectional Electrical Signal Converter," and was filed on Sep. 20, 2013, the entire contents of both disclosures are hereby incorporated herein by reference in their entireties.

TECHNICAL FIELD

The present description generally relates to electrical power conversion systems including systems that convert direct current (DC) signals to alternating current (AC) signals and convert AC signals to a DC signal in different operating modes.

BACKGROUND

Many devices that are operated with electrical power receive the power as either alternating current (AC) or direct current (DC) electrical signals. As is known in the art, electrical power is often delivered through a power grid as an AC signal using one or more AC phases. Electrical rectifier circuits and other devices including switched-mode power supplies are known to the art for the conversion of AC electrical signals to DC signals. Additionally, inverter circuits are known to the art for the conversion of a DC signal to an output AC signal.

Some electrical power systems include multiple modes of operation that use both AC and DC power signals. One example of such a system includes a battery in an energy generation system. For example, wind turbines generate electrical power as an AC waveform. The wind turbines supply some of the electrical power to an electrical utility grid in the form of AC electrical signals, but some of the electrical power is stored in batteries for later use. The electrical generation system includes rectifiers or other known systems to convert the AC signals received from the wind turbines to DC signals in order to charge the batteries. At another time, the batteries generate DC power that is converted back to AC through an inverter. The prior art system requires separate circuits control systems to regulate both the charging and discharging of the battery using both AC and DC power signals. While a battery energy storage system is one example of an electrical system that utilizes both AC and DC signals, many other electrical systems use AC and DC electrical signals in different operating modes. The complexity of separate electrical circuits that perform AC-to-DC and DC-to-AC conversion increases the costs and decreases the reliability of electrical systems that utilize both AC and DC electrical signals. Consequently, improvements to electrical circuits and systems for the conversion from AC-to-DC and from DC-to-AC electrical signals would be beneficial.

SUMMARY

In one embodiment, a bidirectional power converter has been developed. The power converter includes a circuit with a first inductor-capacitor circuit, a second inductor-capacitor circuit configured to be electrically connected to an alternating current (AC) element and the first inductor-capacitor circuit, an electrical switching device electrically connected to the first inductor-capacitor circuit and the second inductor-capacitor circuit, the electrical switching device being configured to switch at a first predetermined frequency corresponding to a frequency of an AC signal from the AC power source, a first switching transistor electrically connected to the first inductor-capacitor circuit and configured to be electrically connected to a direct current (DC) element, and a controller operatively connected to the first switching transistor to operate the power converter in an AC-to-DC mode. The controller is configured to identify a first error between a measured DC output signal from the circuit that is applied to the DC element and a predetermined DC output signal and adjust a first duty cycle of a first pulse width modulation (PWM) switching signal to switch the first switching transistor at a second predetermined frequency with the first adjusted duty cycle to reduce the identified error.

DETAILED DESCRIPTION

For a general understanding of the environment for the system and method disclosed herein as well as the details for the system and method, reference is made to the drawings. In the drawings, like reference numerals have been used throughout to designate like elements.

As used herein, the term "DC element" refers to a component that is electrically connected to a power converter to either supply direct current (DC) electrical power to the power converter or receive DC electrical power from the power converter. A DC element can operate as either a source that supplies power to the power converter, a load that receives power from the power converter, or as both a source and a load in different operating modes. For example, a battery is a DC element that is a DC source when discharging to supply power to a power converter and a DC load when recharging and receiving power from the power converter. As used herein, the term "AC element" refers to a component that is electrically connected to a power converter to either supply alternating current (AC) electrical power to the power converter or receive AC electrical power from the power converter. An AC element can operate as either a source that supplies power to the power converter, a load that receives power from the power converter, or as both a source and a load in different operating modes. An example of an AC electrical element is a connection to a power grid that supplies AC power to the power converter in one operating mode and receives AC power from the power converter in another operating mode.

Figure 1:
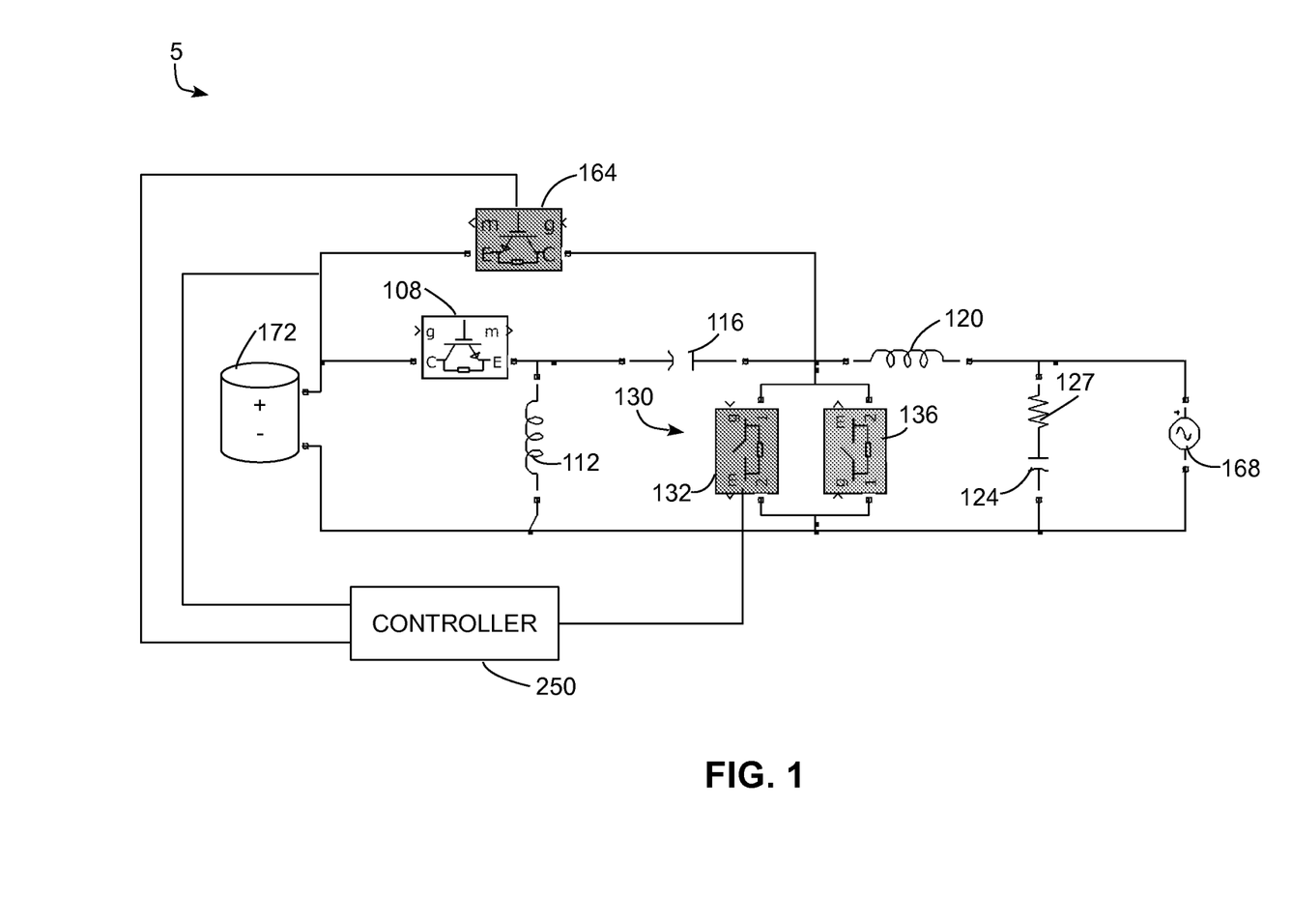
FIG. 1 is a circuit diagram of a bidirectional power converter that generates an AC output signal from a DC input signal in one operating mode and generates a DC output signal from an AC input signal in another operating mode.

FIG. 1 depicts a bidirectional power converter 5. The power converter 5 includes a high-frequency switching transistor 108, an inductor 112 and a capacitor 116, all of which form a first inductor-capacitor (LC) circuit. The converter 5 also includes an electrical switching device 130 that includes synchronous switching transistors 132 and 136, an inductor 120 and a capacitor 124, all of which form a second LC circuit. In FIG. 1, an internal resistance in the second LC circuit is modeled with the resistor 127. The power converter 5 further includes a second high-frequency switching transistor 164 and a controller 250 that is configured to enable generation of a DC output signal from an AC input signal. In the inverter operating mode, a DC element acts as a DC source for the power converter 5. In FIG. 1, the DC element is embodied as a battery 172 or other DC power source generates a DC input signal, and power converter 5 generates an AC output signal.

In FIG. 1, the power converter 5 is electrically connected to an AC element 168 and the battery 172. In the configuration of FIG. 1, the battery 172 acts as a DC load that receives a DC electrical signal from the power converter 5. The AC element 168 acts as an AC source to supply AC power to the power converter 5. The battery 172 is an illustrative example of a DC load, and the power converter 5 is also suited to generate a DC output at a selected voltage level to drive different DC loads using the AC input source 168. In the configuration of FIG. 5, the high-frequency switching transistor 108 and the synchronized transistor 136 are switched to an "off" state to effectively stop the flow of electricity through these transistors as the power converter 5 operates in an AC-to-DC conversion mode. The synchronized transistor 132 in the electrical switching device 130 switches on and off at the predetermined frequency of the input frequency of the AC voltage source 168 (e.g. 50 Hz or 60 Hz) in phase with the AC signal to enable the positive-voltage portions of the AC voltage waveform 168 to be captured by the converter circuit 5 for use in generating a DC output signal while rejecting the negative portions of the AC voltage signal. The high-frequency switching transistor 164 switches on and off at a predetermined frequency in a range of, for example, 2 KHz to 20 KHz. The controller 250 monitors a DC output signal from the power converter 5 that is applied to the battery 172 and applies a pulse-width modulation (PWM) signal to adjust a duty cycle of the high-frequency switching transistor 164 to maintain a predetermined voltage or current level of the output DC signal.

Figure 2:
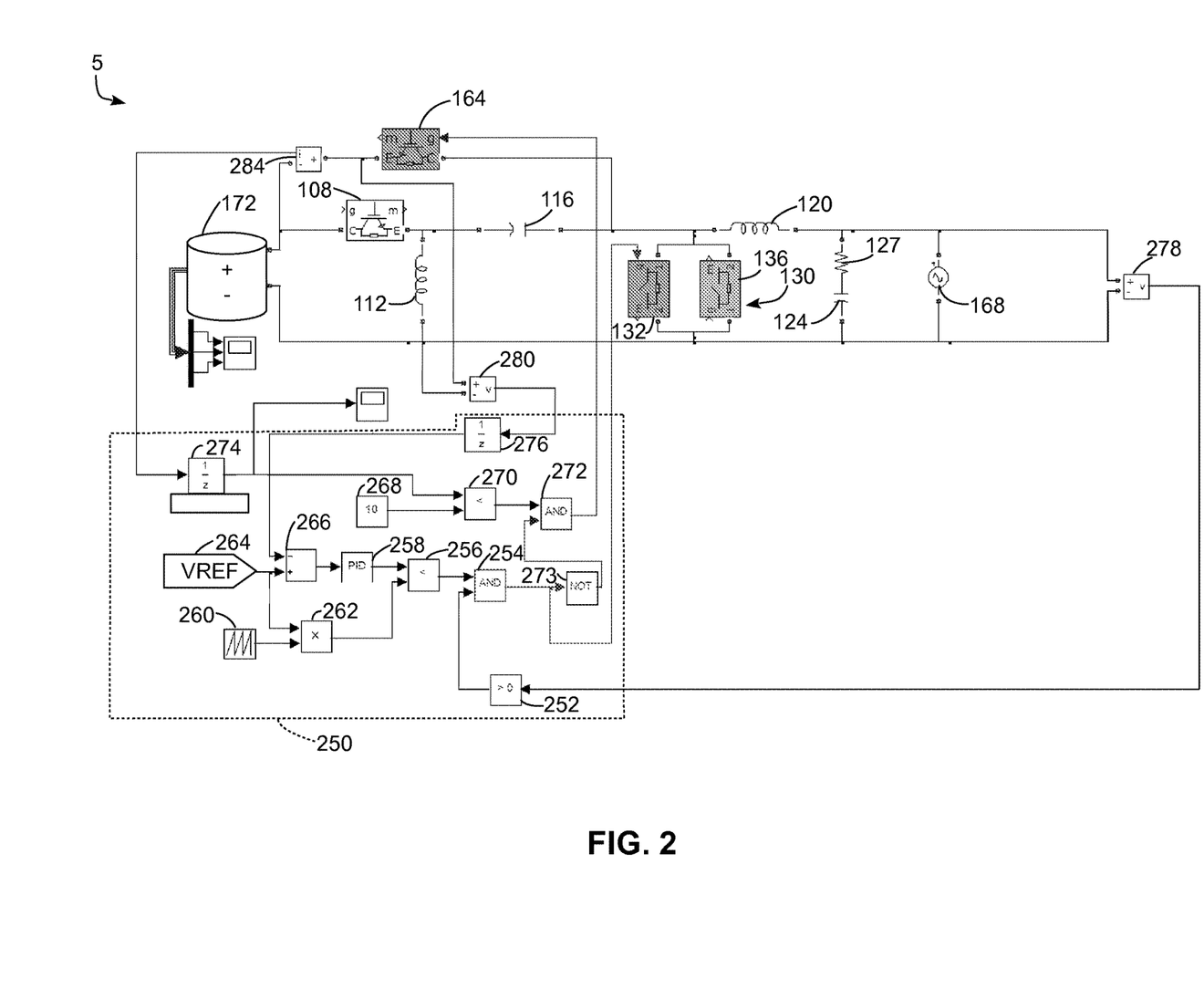
FIG. 2 is a circuit diagram of the bidirectional power converter of FIG. 1 depicting a controller for the bidirectional power converter in more detail.

FIG. 2 depicts the power converter 5 of FIG. 1 and the controller 250 in more detail. The controller 250 is implemented using at least one digital microprocessor, microcontroller, application specific integrated circuit (ASIC), field programmable gate array (FPGA), digital signal processor (DSP) or other suitable digital logic devices. The functional elements of the controller 250 that are depicted in FIG. 2 can be implemented using a combination of hardware and software components. During operation, the controller 250 receives signals from one or more sensors including a voltage measurement sensor 278 that measures the time-varying voltage level of the AC voltage source 168, a voltage measurement sensor 280 that measures a voltage differential between an output of the high-frequency switching transistor 164 and the inductor 112, and a current measurement sensor 284 that measures a level of DC current that flows into the battery 172.

The controller 250 includes a memory that stores a predetermined DC voltage signal reference 264, such as a predetermined voltage level for the DC signal that charges the battery 172 in FIG. 2. In one embodiment, the DC voltage signal reference module 264 is a digital signal generator 264 that is configured to generate a digital representation of a selected output signal. In other configurations, the digital signal generator 264 generates a time-varying AC reference signal when the power converter 5 operates in a DC-to-AC inverter mode. A signal generator module 260 generates a sawtooth signal at the predetermined switching frequency of the high-frequency switching transistor 164, such as the 2 KHz to 20 KHz frequency range described above. A multiplication module 262 generates a scaled output of the present time output of the sawtooth signal multiplied by the reference voltage 264. The reference voltage 264 is added to a time-delayed measured voltage level from a time delay module 276 that receives the measured voltage level from the voltage sensor 280. A difference module 266 subtracts the measured voltage level to the reference voltage level as input to a proportional, integral, differential (PID) control module 258. The difference module 266 generates a feedback error signal for the PID control module 258 corresponding to the measured signal subtracted from the reference signal.

The PID control module 258 sets a control point threshold to adjust the duty cycle of the high-frequency switching transistor 164 based on the measured voltage level of the DC circuit and the predetermined set level. For example, in one configuration the PID control module 258 raises the control point if the measured voltage drops below the predetermined reference voltage level and lowers the control point if the measured voltage rises above the predetermined reference voltage level. While FIG. 2 depicts a PID control module 258, alternative embodiments include different control logic including, but not limited to, PI, adaptive, self-tuning, variable structure, sliding mode, optimal, robust, model predictive, and any other suitable control logic.

In the controller 250, a relative comparator 256 generates a logical "1" when the output of the multiplier 262 corresponding to the present-time value of the sawtooth signal generator 260 is less than the control point from the PID control module 258. The output of the relative comparator 256 and an output of another comparator 252 form inputs to a logical NAND module that comprises the AND module 254 and NOT module 273 in the embodiment of FIG. 2. The comparator 252 asserts a logical "1" when the output signal from the AC voltage source 168 is a positive voltage. The logical NAND module asserts "1" only when the respective outputs of the relative comparator 256 and the comparator 252 are logical "1" and "0", "0" and "1", or "0" and "0". Thus, the NAND module asserts "0" when both the relative comparator 256 and comparator 252 assert a logical "1". The AND module 272 generates a logical "1" to activate the high-frequency switching transistor 164 or a logical "0" to deactivate the high-frequency switching transistor when the NAND module asserts "1" and when the measured current level to the battery 172 is below a predetermined maximum reference current level, as described in more detail below.

The controller 250 also stores a predetermined maximum DC-load current 268 in the memory. In FIG. 2 the battery charging reference voltage is 200V and the battery charging current level reference is 10 A. The controller 250 adjusts the duty cycle of the high-frequency switching transistor 164 to maintain a DC charging signal at the reference voltage level. If the current applied to the battery 172 exceeds the predetermined current level, then the controller 250 switches off the high-frequency switching transistor 164 without regard to the output of the PID control module 258 and the NAND module described above. In FIG. 2, a time delay module 274 provides a time-delayed digital measurement from the current measurement sensor 284, the relational operator module 270 generates a logical "1" when the measured current is below the maximum current reference 268. The AND module 272 generates a "0" to switch off the transistor 164 whenever the measured current exceeds the maximum current reference 268, and generates a "0" or a "1" based on the input from the NAND module when the measured current level is below the maximum current reference 268.

The controller 250 generates a signal to switch the synchronous transistor 132 using an input from a voltage sensor 278 and the comparator 252 that generates a logical "1" when the AC output voltage is positive. Additionally, an output of the relative comparator 256 and the comparator 252 are inputs to an AND module 254 that asserts a high signal to activate the synchronous transistor 132 only when the output of the AC signal generator 168 is positive and when the present value of the sawtooth signal is below the control threshold that is set by the PID control module 258.

Figure 5A:
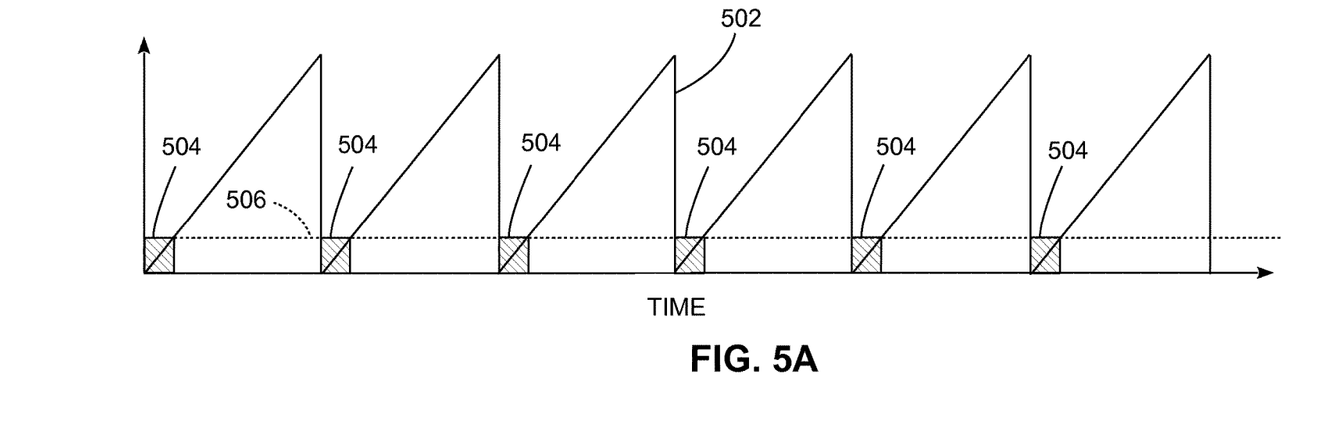
FIG. 5A is a diagram of a pulse width modulated (PWM) control signal that is generated to control the operation of the circuits of FIG. 1-FIG. 3.
Figure 5B:
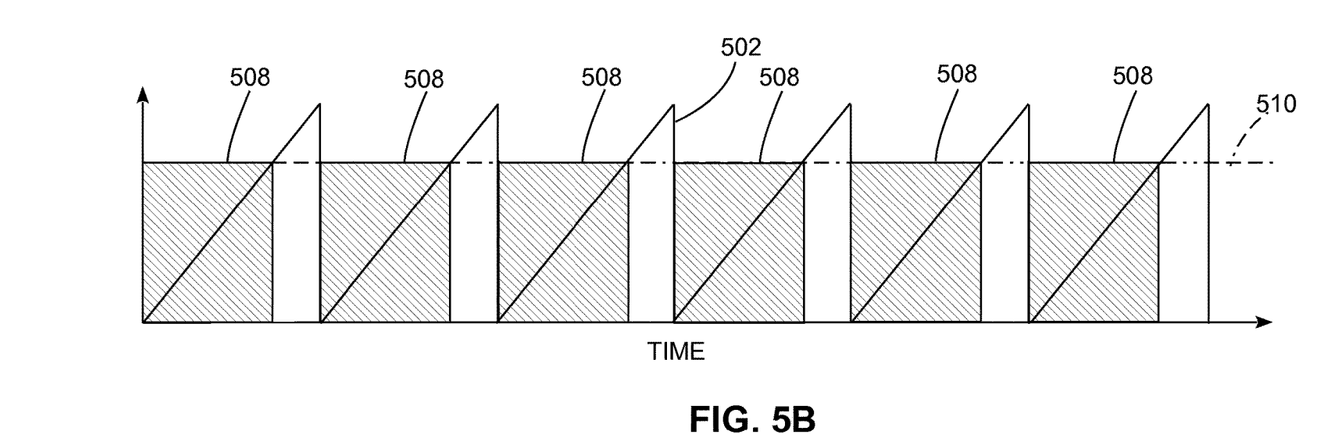
FIG. 5B is a diagram of another PWM control signal that is generated to control the operation of the circuits of FIG. 1-FIG. 3.

As depicted in FIG. 5A and FIG. 5B, the sawtooth generator 328 generates a sawtooth signal 502 at a predetermined frequency, such as a frequency in a range of 2 KHz to 20 KHz, which switches the high-frequency switching transistor 108 on and off at the sawtooth frequency. The frequency from the sawtooth generator 260 is substantially higher than the frequency of the AC source 168 in the AC-to-DC mode or the output AC frequency in the DC-to-AC mode operating mode. For example, in many embodiments the AC source 168 generates an AC power signal at a frequency of 50 Hz or 60 Hz corresponding to the AC waveforms that are commonly used in many electric grids, or at a frequency of several hundred Hz (e.g. 400 Hz) as is used in some electric generators and motors. The sawtooth signal generator 328 generates the output signal for the high-frequency switching transistors at substantially higher frequencies (e.g. 2 KHz to 20 KHz) to enable the controller 250 to adjust the delivery of electrical power from the DC source 104 to the circuit 10 to track the DC output from the reference signal generator 102 accurately. Thus, the transistors 108 and 164 are also referred to as a "high-frequency" switching transistors. The duty cycle refers to a proportion of each cycle of the sawtooth signal for which the high-frequency switching transistor 108 is activated or deactivated during operation of the power converter.

In FIG. 5A and FIG. 5B, the high-frequency switching transistor 108 or 164 is switched on whenever the output level of the sawtooth waveform is less than a threshold of the control signal level, and deactivated whenever the output level of the sawtooth waveform exceeds the threshold of the control signal level. In FIG. 5A, the controller 250 sets a lower control signal level threshold 506, and the comparator 256 switches the transistor 108 or 164 on during the periods 504, while the transistor 108 or 164 is switched off during the remaining portions of each cycle of the sawtooth signal 502. In FIG. 5B, the controller 250 generates a higher control signal level threshold 510 for a higher corresponding duty cycle. The comparator 224 switches on the transistor 108 for longer periods 508 during each cycle of the sawtooth signal 502. As described in more detail below, the controller 250 increases and decreases the output threshold to adjust the duty cycle of the high-frequency switching transistor 108 to maintain an output signal from the circuit 10 that corresponds to the reference signal and adjusts for variations in the output of the DC source 104 and characteristics of the load 127. In some embodiments, the controller 250 limits the maximum threshold level for the control signal to a level that is lower than a 100% duty cycle where the high-frequency transistor 108 or 164 remains in the switched-on state for the entire cycle of the sawtooth signal generator 260.

Referring again to FIG. 1 and FIG. 2, the power converter circuit generates a DC output signal from the positive portions of an AC input signal waveform. In another configuration, the high-frequency switching transistor is electrically connected to a negative terminal of the DC load 172 and the logic of the comparator 252 is reversed to enable the generation of the DC signal from the negative portion of the AC input signal.

Figure 3:
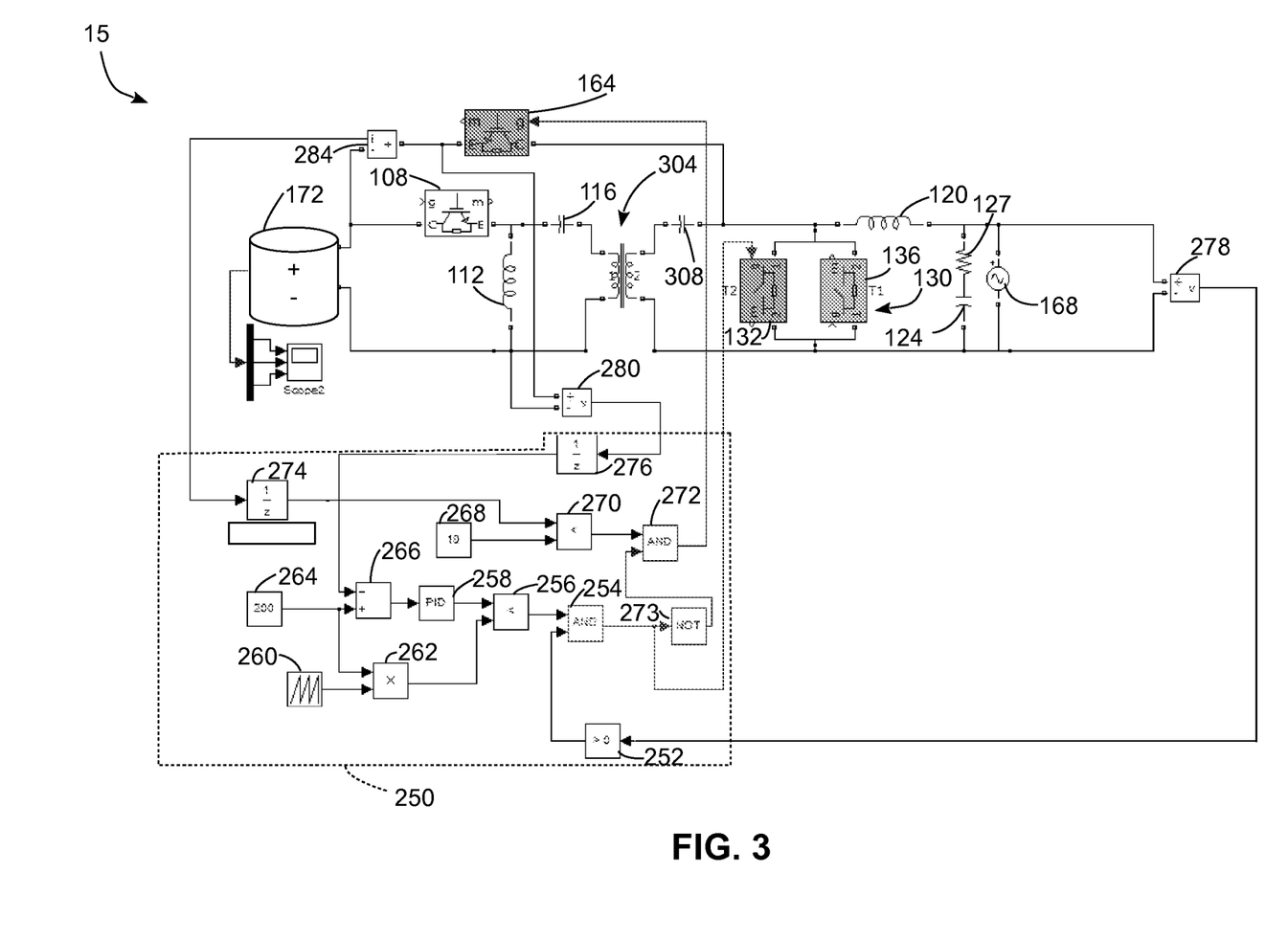
FIG. 3 is a circuit diagram of the bidirectional power converter of FIG. 2 that includes an additional transformer and capacitor to isolate the DC load or source from the AC load or source during operation of the power converter.

FIG. 3 depicts another embodiment of a power converter circuit 15. The power converter circuit 15 is similar to the configuration of FIG. 1 and FIG. 2, but the circuit 15 includes a transformer 304 and capacitor 308. One side of the transformer 304 is electrically connected to the LC circuit with the capacitor 116 and inductor 112, while the other side of the transformer 304 is connected to the capacitor 308, the electrical switching device 130, and the LC circuit with the capacitor 124 and inductor 120. The capacitor 308 is also electrically connected to the inductor 120, high-frequency switching transistor 164, and the electrical switching device 130. The transformer 304 provides isolation between the DC and AC sides of the power converter circuit 15, which protects a DC load from power fluctuations or electrical noise in an AC source, and protects an AC load from similar power fluctuations or noise in a DC source. The bidirectional power converter circuit 15 operates in a DC-to-AC or AC-to-DC mode in a similar manner to the embodiments of FIG. 1 and FIG. 2.

The configurations of the power converters in FIG. 1-FIG. 3 can be used in operating environments where the electrical voltage level of an AC source is less than the drive voltage of a DC load. For example, in an automobile with regenerative braking, the output of an AC generator in the brakes may be less than the DC voltage level that is used to charge a battery in the vehicle. The bidirectional converter operates in a "boost" mode to generate a higher DC voltage output than the voltage amplitude of an AC source. In another "buck" configuration, the bidirectional converter generates an output that is less than the voltage level of a DC or AC source.

Figure 4:
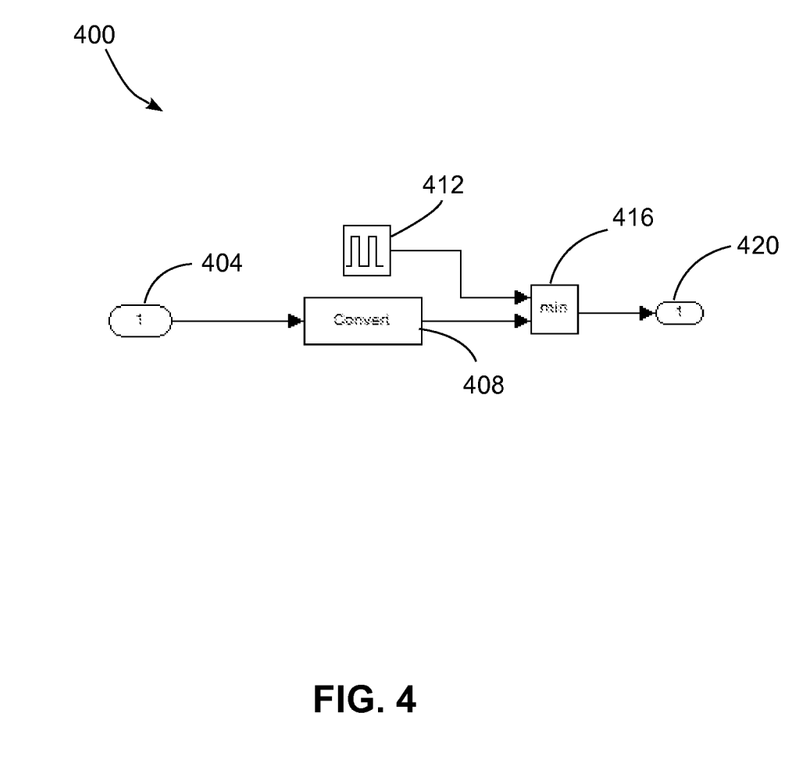
FIG. 4 is a schematic diagram of a control process for the circuits of FIG. 1 and FIG. 2 that limits a flow of electrical current to increase the efficiency of AC-to-DC or DC-to-AC electrical conversion.

FIG. 4 depicts a schematic diagram 400 of an optional control strategy that is incorporated with the circuits of FIG. 2 and FIG. 3 to limit the duty cycle of the first high-frequency switching transistor 108 and the second high-frequency switching transistor 164 in DC-to-AC or AC-to-DC operating modes, respectively. The control strategy depicted in FIG. 4 includes a binary input 404, conversion 408, pulse-wave generator 412 with a predetermined duty cycle, minimum comparator 416, and an output 420. In the diagram 400, a binary input 404 represents the on/off duty cycle output from the controller 250 that switches the high-frequency transistors 108 or 164 on and off during operation. In the embodiment of FIG. 4, a conversion block 408 converts the binary value (e.g. 0 or 1) into an integer number, floating-point number, or other numeric format that is suitable for comparison to an output of the pulse generator 412. The pulse generator 412 generates a time varying output "pulse" or square-wave signal that has the same frequency as the control signal input 404 and has a predetermined duty cycle where the square wave is in the "high" state. For example, in one embodiment the pulse generator 412 generates numeric values corresponding to an output signal with a 75% duty cycle. The minimum comparator 416 receives the inputs from the conversion unit 408 and the pulse generator 412. The minimum comparator generates an output signal 420 with a duty cycle that corresponds to a minimum of either the original binary input 404 or the output of the pulse generator 412. Thus, when the duty cycle of the binary input 404 is less than the predetermined duty cycle of the pulse generator 412, the output signal 420 has the same duty cycle as the input 404. When the duty cycle of the input 404 exceeds the duty cycle of the signal from the pulse generator 412, the output signal 420 has the predetermined maximum duty cycle from the pulse generator 412.

The control strategy in the diagram 400 limits the level of current that is supplied to the inductor 112, which improves the efficiency of conversion during periods when the high-frequency switching transistor 164 operates with high duty-cycles. The controller 250 adjusts the level of stored energy in the inductor based on the requirements of the load to improve the efficiency of operation for the power converter. The inductor current is therefore decreased which increases the power conversion efficiency. In a DC-to-AC inversion mode, the discharge circuit operates the high-frequency switching transistor 108 at the required (limited) duty cycle at rate of carrier frequency, and the transistors 132 and 136 in the electrical switching device 130 at rate 60 Hz, or another output frequency of the AC signal, to generate an output signal with the predetermined reference waveform. In an AC-to-DC chopper mode, the control circuit enables the synchronization of the bidirectional AC-to-DC transistor 164 and the electrical switching device 130 with the carrier frequency of the AC source 168 to build up the voltage level required for the DC load 172 to accept the DC current. In the embodiments of FIG. 1-FIG. 2, the DC charge has a voltage level that is sufficient to charge the battery 172. The level is also controlled by the amount of current being injected to the battery 172.

Figure 6:
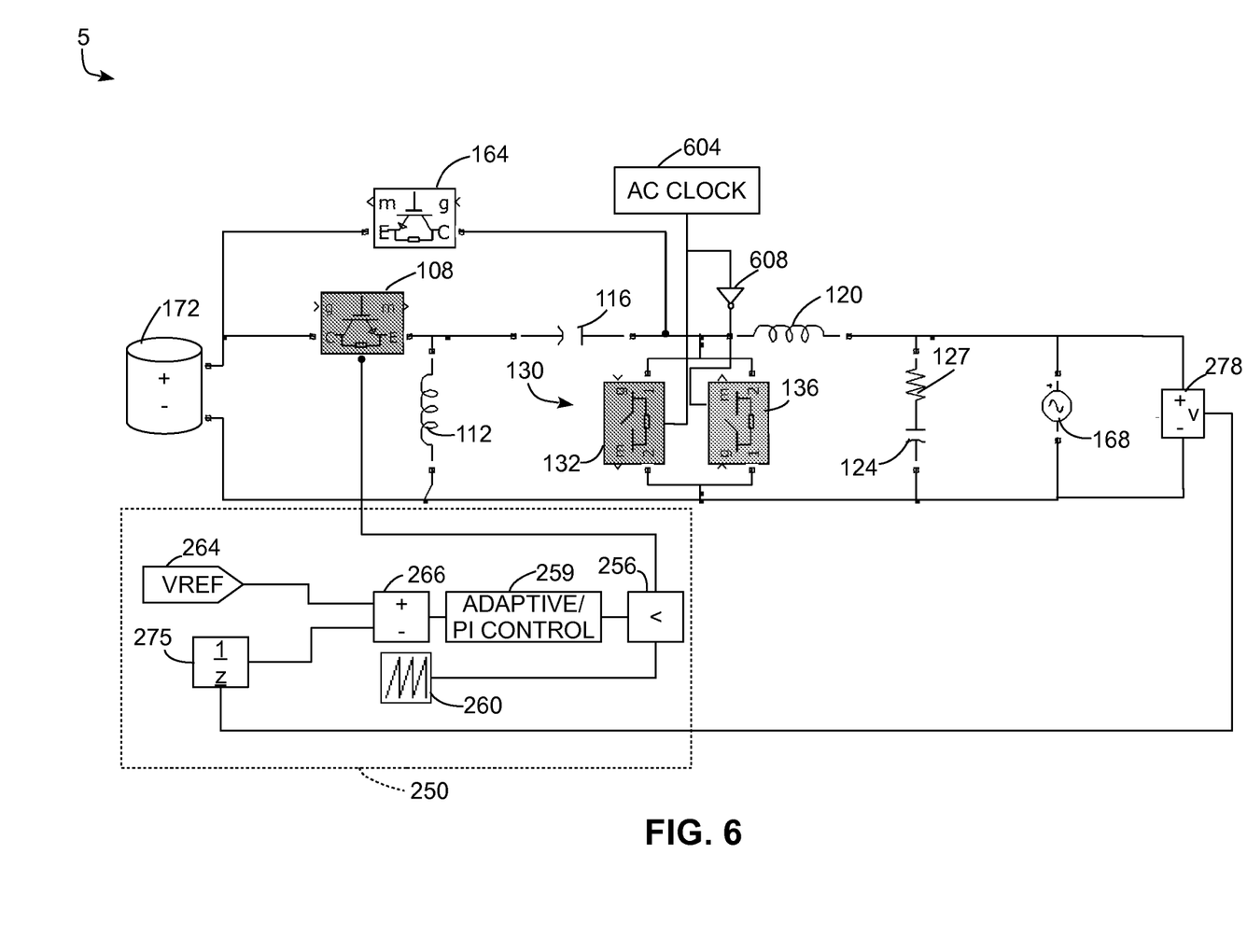
FIG. 6 is a schematic diagram of the bidirectional power converter of FIG. 2 when operating in a DC-to-AC inverter mode.

In the configurations of FIG. 1-FIG. 3, the power converter 5 operates in an AC-to-DC conversion mode where the DC element 172 is a DC power source and the AC element 168 is an AC load that receives an AC output power signal from the power converter 15. FIG. 6 depicts the power converter embodiments of FIG. 1 and FIG. 2 in a DC-to-AC inversion operating mode. In the configuration of FIG. 6, the circuit also includes an AC clock signal generator 604 and a signal inverter (NOT-gate) 608. The controller 250 is reconfigured with the reference signal generator 264, another feedback unit delay circuit 275 that provides feedback from the AC voltage sensor 278, the difference module 266, a hybrid adaptive/proportional integral (PI) controller 259, and a comparator 256. During operation in the DC-to-AC mode, the controller 250 generates a PWM control signal to switch the high-frequency switching transistor 108 on and off with varying duty cycles while the high-frequency switching transistor 164 remains switched off. Those of skill in the art will recognize that the circuit of FIG. 6 can also be modified to incorporate the transformer 304 and capacitor 308 in the embodiment of FIG. 3 for operation in the DC-to-AC mode.

During operation in the DC-to-AC mode, the AC clock generator signal generator 604 generates a switching clock signal at a selected output frequency of the AC output signal that the power converter 15 generates to drive the AC load element 168. In many instances the AC output clock 604 operates at 50 Hz or 60 Hz for many loads that operate on utility grid power, although the output clock 604 can generate output signals over a wide frequency range for different AC signals. In the configuration of FIG. 6, the electrical switching device 130 uses both the transistors 132 and 136 in an inverted configuration to generate both positive and negative portions of the AC output power signal.

In the configuration of FIG. 6, the output of the AC clock generator 604 switches the transistor 132, and the inverter 608 generates a complementary signal from the clock generator 604 to switch the transistor 136. Thus, the transistor 132 is switched on whenever the transistor 136 is switched off, and vice versa. In the controller 250, the reference signal generator 264 generates a digital representation of an output reference AC waveform that should be provided to the AC load 168. Common examples of output waveforms include sinusoidal waveforms, although the power converter 15 can be configured to generate other waveforms including, but not limited to, triangular, staircase, square, hyperbolic, and non-uniform output waveforms. In the controller 250, the unit delay module 275 receives output voltage measurements from the voltage sensor 278, applies a unit delay for feedback, and generates an output signal for the difference module 266.

In the embodiment of FIG. 6, the controller 250 or the sensor 278 implements an analog to digital converter (ADC) to generate a digital representation of the measured voltage signal that is scaled to the digital representation of the reference signal generator 264. The difference module 266 is connected to the outputs of the reference signal generator 264 and the unit delay module 275. The difference module 266 generates an output corresponding to the error (difference) between the reference output signal level and the measured output signal. In the configuration of FIG. 6, the controller 250 implements a hybrid adaptive and proportional-integral (PI) control module 259 that receives the error signal from the difference module 266 and generates the control signal output that adjusts the duty cycle of the PWM signal for the high-frequency switching transistor 108. In alternative embodiments, the controller 259 is implemented using a PID controller, a PI controller, or any other suitable controller implementation. The controller 250 uses the same sawtooth waveform generator 260 and comparator module 256 that is used in the AC-to-DC operating mode to generate a PWM output signal with varying duty cycle levels to operate the high-frequency switching transistor 108. During operation, the controller 250 continues to adjust the duty cycle of the PWM output signal to reduce or eliminate errors between the output AC signal that drives the AC load 168 compared to the reference AC output signal waveform.

While the embodiments have been illustrated and described in detail in the drawings and foregoing description, the same should be considered as illustrative and not restrictive in character. The reader should understand that only the preferred embodiments have been presented and that all changes, modifications and further applications that come within the spirit of the invention are desired to be protected as set forth in the following claims.

What is claimed is:
1. A power converter comprising:
 a circuit comprising:
 a first inductor-capacitor circuit;

a second inductor-capacitor circuit configured to be electrically connected to an alternating current (AC) element and the first inductor-capacitor circuit;

an electrical switching device electrically connected to the first inductor-capacitor circuit and the second inductor-capacitor circuit, the electrical switching device being configured to switch at a first predetermined frequency corresponding to a frequency of the AC element;

a first switching transistor electrically connected to the first inductor-capacitor circuit and configured to be electrically connected to a direct current (DC) element; and a controller operatively connected to the first switching transistor to operate the power converter in an AC-to-DC conversion mode, the controller being configured to:

identify a first error between a measured DC output signal from the circuit that is applied to the DC element and a predetermined DC output signal; and adjust a first duty cycle of a first pulse width modulation (PWM) switching signal to switch the first switching transistor at a second predetermined frequency with the first adjusted duty cycle to reduce the identified error, wherein the second predetermined frequency is greater than the first predetermined frequency.

2. The power converter of claim 1 further comprising:
a transformer electrically connected to the first inductor-capacitor circuit and the second inductor-capacitor circuit to electrically isolate the first inductor-capacitor circuit and the second inductor-capacitor circuit.

3. The power converter of claim 1, the controller being further configured to:
adjust the first duty cycle of the first PWM switching signal to a predetermined maximum duty cycle level in response to the adjusted duty cycle exceeding the predetermined maximum duty cycle level, the predetermined maximum duty cycle level being less than 100% duty cycle.

4. The power converter of claim 1, the controller further comprising:
a difference module configured to generate an error signal corresponding to a difference between the measured DC output signal and the predetermined DC output signal;
a signal generator configured to generate a periodic signal at the second predetermined frequency;
a comparator configured to receive the periodic signal from the signal generator and a control signal to generate the first PWM switching signal to switch the single switching transistor at the predetermined frequency with the first duty cycle of the first PWM switching signal corresponding to a proportion of the periodic signal that is below a level of a control signal from the controller; and
the controller being further configured to:
generate the control signal at a level between a minimum level and a maximum level of the periodic signal from the signal generator to adjust the first duty cycle of the first PWM switching signal with reference to the error signal from the difference module.

5. The power converter of claim 4, the controller further comprising:
a proportional integral differential (PID) control module configured to receive the error signal from the difference module and generate the control signal for the comparator with reference to the error signal.

6. The power converter of claim 4 wherein the signal generator is configured to generate a sawtooth periodic signal at the second predetermined frequency.

7. The power converter of claim 1 wherein the second predetermined frequency is in a range of approximately 2 KHz to 20 KHz and the first predetermined frequency is approximately 60 Hz.

8. The power converter of claim 1 wherein the second predetermined frequency is in a range of approximately 2 KHz to 20 KHz and the first predetermined frequency is approximately 50 Hz.

9. The power converter of claim 1, the circuit further comprising:
a second switching transistor electrically connected to the DC element and the first inductor-capacitor circuit; and
the controller being operatively connected to the second switching transistor to operate the power converter in a DC-to-AC mode, the controller being further configured to:
identify a second error between a measured AC output signal from the circuit that is applied to the AC element and a predetermined AC output signal for the AC element; and
adjust second duty cycle of a second PWM switching signal to switch the second switching transistor at the second predetermined frequency with the second adjusted duty cycle to reduce the second error.

10. The power converter of claim 9, the controller being further configured to:
switch the second switching transistor off during the AC-to-DC operating mode; and
switch the first switching transistor off during the DC-to-AC operating mode.

11. The power converter of claim 9, the controller further comprising:
a difference module configured to generate an error signal corresponding to a difference between the measured AC output signal and the predetermined AC output signal;
a signal generator configured to generate a periodic signal at the predetermined frequency;
a comparator configured to receive the periodic single from the signal generator and a control signal from the controller to generate the pulse-width modulated (PWM) signal to switch the signal switching transistor at the predetermined frequency with the duty cycle of the PWM signal corresponding to a proportion of the periodic signal that is below a level of the control signal from the controller; and
the controlled being operatively connected to the difference circuit and the comparator, the controller being further configured to:
generate the control signal at a level between a minimum level and a maximum level of the periodic signal from the signal generator to adjust the duty cycle of the PWM signal with reference to the error signal from the difference circuit.

12. The power converter of claim 11, the controller further comprising:
a hybrid adaptive proportional integral (PI) control module configured to receive the error signal from the difference module and generate the control signal from the comparator with reference to the error signal.

13. The power converter of claim 11 wherein the signal generator is configured to generate a sawtooth periodic signal at the second predetermined frequency.

14. The power converter of claim 9 wherein the electrical switching device essentially comprises two transistors.

15. A method for converting power comprising the steps of:
providing a circuit comprising a first inductor-capacitor circuit, a second inductor-capacitor circuit configured to be electrically connected to an alternating current (AC) element and the first inductor-capacitor circuit, an electrical switching device electrically connected to the first inductor-capacitor circuit and the second inductor-capacitor circuit, the electrical switching device being configured to switch at a first predetermined frequency corresponding to a frequency of the AC element, a first switching transistor electrically connected to the first inductor-capacitor circuit and configured to be electrically connected to a direct current (DC) element and a controller operatively connected to the first switching transistor to operate the power converter in an AC-to-DC conversion mode;
identifying a first error between a measured DC output signal from the circuit that is applied to the DC element and a predetermined DC output signal; and
adjusting a first duty cycle of a first pulse width modulation (PWM) switching signal to switch the first switching transistor at a second predetermined frequency with the first adjusted duty cycle to reduce the identified error, wherein the second predetermined frequency is greater than the first predetermined frequency.

16. The method of claim 15, further comprising the step of:
adjusting the first duty cycle of the first PWM switching signal to a predetermined maximum duty cycle level in response to the adjusted duty cycle exceeding the predetermined maximum duty cycle level, the predetermined maximum duty cycle level being less than 100% duty cycle.

17. The method of claim 15, further comprising:
identifying a second error between a measured AC output signal from the circuit that is applied to the AC element and a predetermined AC output signal for the AC element; and
adjusting a second duty cycle of a second PWM switching signal to switch a second switching transistor at the second predetermined frequency with the second adjusted duty cycle to reduce the second error.

18. A power converter comprising:
a circuit including
a first inductor-capacitor circuit;
a second inductor-capacitor circuit configured to be electrically connected to an alternating current (AC) element and the first inductor-capacitor circuit;
an electrical switching device electrically connected to the first inductor-capacitor circuit and the second inductor-capacitor circuit, the electrical switching device being configured to switch at a first predetermined frequency corresponding to a frequency of the AC element;
a first switching transistor electrically connected to the first inductor-capacitor circuit and configured to be electrically connected to a direct current (DC) element;
a second switching transistor electrically connected to the DC element and the first inductor-capacitor circuit; and
a controller operatively connected to the second switching transistor to operate the power converter in a DC-to-AC conversion mode, the controller being configured to:
identify an error between a measured AC output signal from the circuit that is applied to the AC element and a predetermined AC output signal for the AC element; and
adjust a duty cycle of a pulse width modulation (PWM) switching signal to switch the second switching transistor at a second predetermined frequency with the adjusted duty cycle to reduce the error.

19. The power converter of claim 18, the controller further comprising:
a difference module configured to generate an error signal corresponding to the error identified between the measured AC output signal and the predetermined AC output signal;
a signal generator configured to generate a periodic signal at the second predetermined frequency;
a comparator configured to receive the periodic signal from the signal generator and a control signal from the controller to generate the PWM switching signal to switch the switching transistor at the predetermined frequency with the duty cycle of the PWM switching signal corresponding to a proportion of the periodic signal that is below a level of the control signal from the controller; and
the controller being further configured to:
generate the control signal at a level between a minimum level and a maximum level of the periodic signal from the signal generator to adjust the duty cycle of the PWM switching signal with reference to the error signal from the difference module.

* * * * *